Patented Mar. 15, 1938

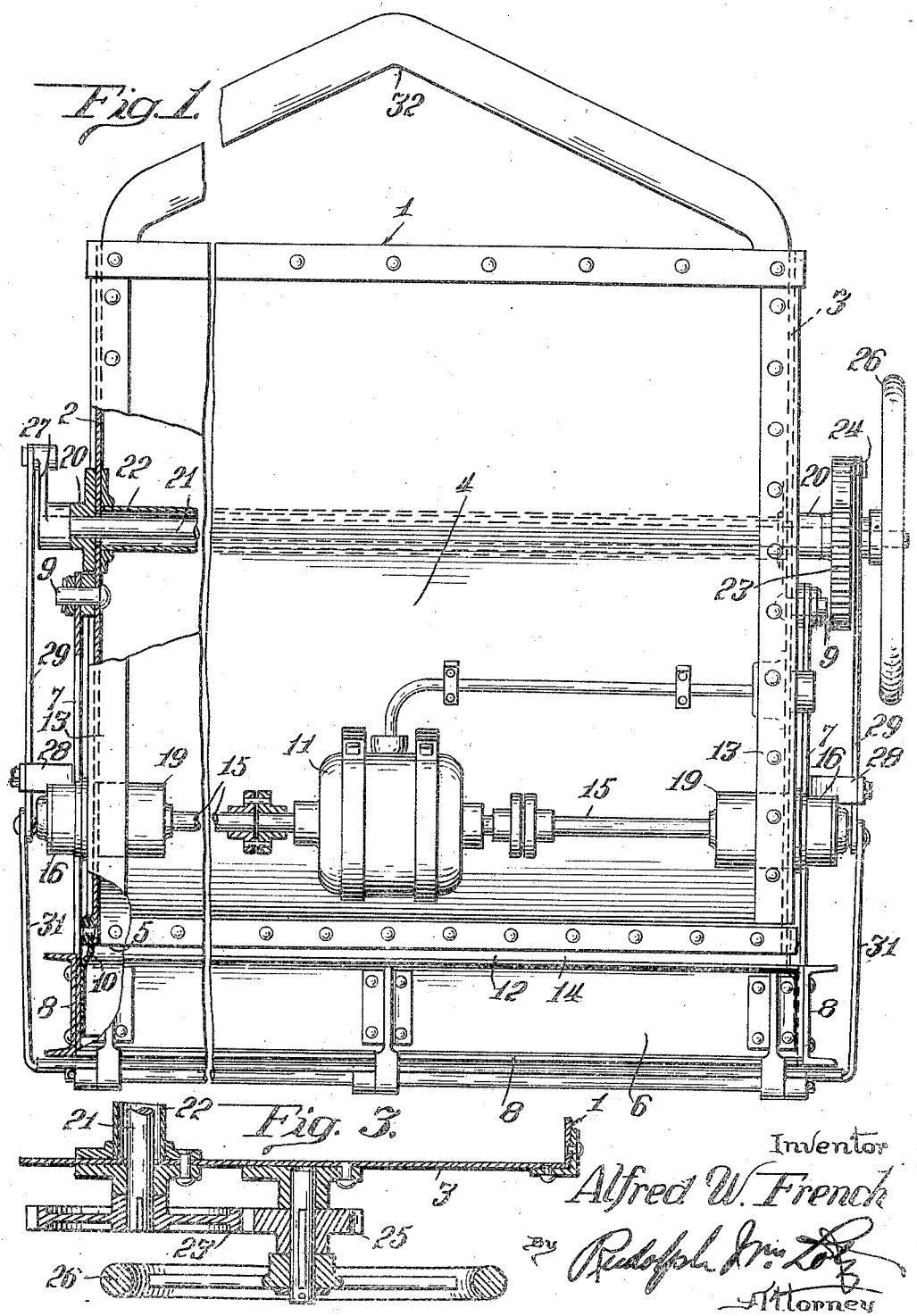

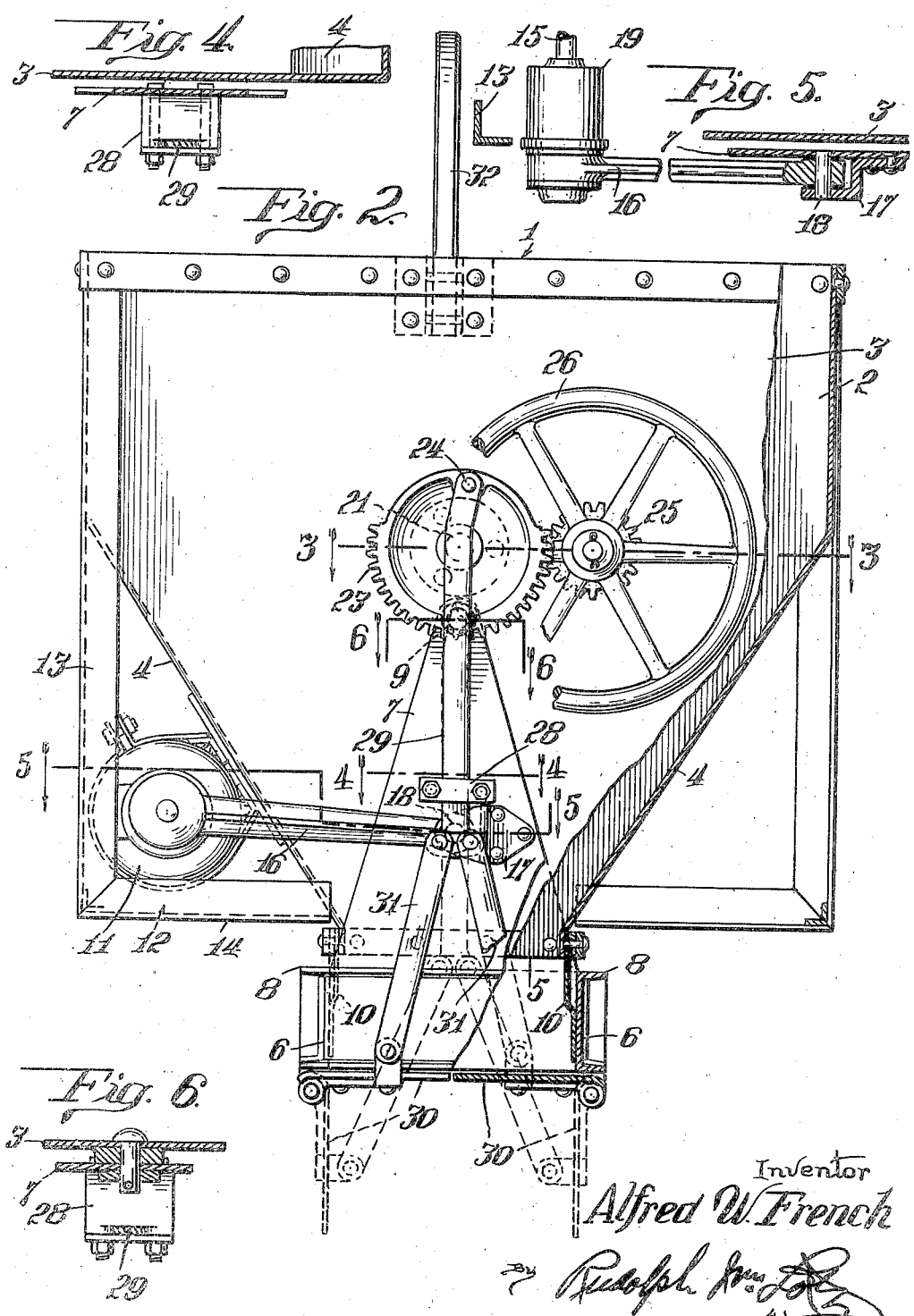

2,111,261

UNITED STATES PATENT OFFICE 2,111,261

APPARATUS FOR TREATING AND LAYING CONCRETE MIX

Alfred W. French, Chicago, Ill.

Application April 20, 1936, Serial No. 75,372

10 Claims. (Cl. 259—36)

The main object of the present invention is to provide a conveyor bucket, or the like, which receives concrete mix from a suitable mixing plant, converts said mix into plastic, workable concrete, and then is operable to deposit the converted mix in place.

The present apparatus is designed to carry out the method described and claimed in my co-pending application Serial No. 43,982, and has for a further particular object to provide apparatus of the type specified which will continue action on the converted mix after it is deposited, for purposes hereinafter set forth.

A suitable embodiment of the invention is illustrated in the accompanying drawings, wherein:

Fig. 1 is a front elevation, partly in section, of an apparatus constructed in accordance with the invention.

Fig. 2 is a side elevation of the same, partly in section.

Fig. 3 is a fragmentary detail plan sectional view of the same taken on the line 3—3 of Fig. 2.

Fig. 4 is a fragmentary detail plan sectional view of the same taken on the line 4—4 of Fig. 2.

Fig. 5 is a fragmentary detail plan sectional view of the same taken on the line 5—5 of Fig. 2.

Fig. 6 is a fragmentary detail plan sectional view of the same taken on the line 6—6 of Fig. 2.

The apparatus embodying the present invention comprises a receptacle 1 of the type commonly known as a hopper. In the instance illustrated, said receptacle comprises a rectangular upper end portion having parallel side and end walls 2 and 3, respectively, and wherein the end walls have tapered lower end portions to which the converging portions 4 of the side walls are secured along their side edges to provide a hopper bottom which is open at its lower end 5 so that material delivered into the receptacle will be free to flow from the bottom thereof.

Disposed below the open end 5 of said receptacle, is a rectangular chute 6 which is of slightly larger dimensions than the said opening 5 and which is disposed at a slightly lower elevation than the bottom of said receptacle.

A pair of suspension devices 7 are secured along their lower end portions, (which constitute the end walls of the said chute 6), to the channel bars 8 (which constitute the side walls of the chute 6) and are pivotally secured at their upper end portions at the points 9 to the end walls 3 of the receptacle, said points or pivots 9 being spaced well above the upper edge of the chute 6. As will be seen by reference to Figs. 5 and 6, the said suspension members 7 are spaced from the end walls 3 of the receptacle.

Rubber or similarly flexible aprons 10 are secured along their lower edge portions to the inner faces of the peripheral walls of the chute 6 and along their upper edges to the walls of the receptacle bordering the openings 5 thereof and bridge the gap between the upper edge of the chute 6 and the rim of the opening 5 of the receptacle.

An electric motor 11 is suitably rigidly secured to the receptacle 1 in a housing mounted upon the latter which is triangular in vertical section and comprises one of the tapered walls 4 of the receptacle, a horizontal wall 12 and a vertical wall 13, said walls 12 and 13 being carried by the L-shaped angle bars 14 embracing the corners of the upper end portion of the receptacle 1 and the lower arms of which are secured at their terminals to the end walls 3 of the receptacle adjacent the opening 5 of the latter. Triangular end walls are provided to complete the motor housing, but are omitted from illustration. Obviously, said walls 12 and 13 may also be omitted if desired.

The shaft 15 of the motor 11 is equipped at its ends with eccentrics which serve to reciprocate the connecting rods 16, the latter being pivotally secured at their other ends to the suspension members 7 of the chute by means of brackets 17 and pins or stud shafts 18, as shown in Fig. 5.

It will be obvious, of course, that the said respective ends of the motor shaft 15 are journalled in bearings 19 suitably rigidly secured to the receptacle frame members and walls. The eccentrics on the shaft 15 are not illustrated in detail, as this is deemed unnecessary to enable those skilled in the art to understand the invention.

Journalled in bearings 20 mounted upon the end walls 3 of the receptacle, is a shaft 21 which extends through a pipe 22 rigidly secured to and which spans the space between the said end walls 3. Said shaft 21 is equipped at one end with a spur gear wheel 23 which is equipped with a crank-pin 24. The said spur gear wheel 23 meshes with a spur pinion 25 rigid with the hand wheel 26 suitably mounted rotatably upon one end wall 3 of the receptacle as shown more particularly in Fig. 3.

The other end of said shaft 21 is equipped with a crank arm 27. Each of the suspension devices 7 is provided between its ends with a guide member 28, as shown in Fig. 4, through which the lower end portions of connecting rods 29 extend, the said connecting rods 29 being connected at their upper ends with the crank pin 24 and the crank arm 27 respectively.

Hinged to the lower ends of the side walls of the chute 6 is a pair of drop-gates 30 clearly shown in Fig. 2. Said gates 30 constitute a closure for the lower end of the chute 6. Said gates are connected at opposite ends with the lower ends of links 31 which, at their upper ends, are pivotally connected with the lower ends of the connecting rods 29.

The said receptacle 1 is equipped with a suitable bail 32 by means of which it is suspended from a derrick or other supporting device, which will be equipped with suitable means for imparting vertical as well as lateral movement to the receptacle.

The operation of the device is as follows:

Concrete mix of any suitable type, such, for example, as is composed of Portland cement mixed with customary aggregates, or of bituminous material and customary aggregates is received.

The gates 30 of the chute 6 will be closed at the time of reception of the material which then will be transported to a point above the predetermined place of deposit of the mix. When disposed above said point of deposit, the receptacle will be lowered until the gates 3 are disposed only slightly above the surface upon which the concrete mix is to be deposited.

As soon as the receptacle approaches the last-named position, the motor 11 will be connected with a source of power and operated to impart to the suspension members 7 and chute 6 a very rapid but short-stroke rocking movement which will be substantially reciprocatory, so far as the chute 6 is concerned. This motion of the chute 6 will cause the lower end portion of the mass of material contained in the receptacle to be violently shaken and projected en masse alternately against the opposite side walls of the chute 6 while said portion of the mass remains under the column-head pressure of the material disposed in the body of the receptacle. This violent movement of the chute 6 and projection of the mass alternately against opposite side walls of the said chute, combined with the force of gravity exerted upon the mass, will force the solid aggregates of the mass to become disposed quickly in what may be termed "keyed" relation to each other. The mortar-forming constituents of the mass, consisting in the case of Portland cement concrete, of the sand, cement and water, will be rapidly liquefied or converted into a paste form and will be distributed forcibly in thin courses between the solid aggregates of the mass disposed within the zone of influence of the reciprocation or rocking movement of the chute 6. The surplus mortar-forming constituents, together with any gases that have been trapped in the mass during the preceding mixing operation, will be displaced from the portion of the mass disposed within the zone of influence of the chute 6 and will take the course of least resistance through the balance of the mass upwardly.

After a preliminary or initial rocking or reciprocation of the chute 6 for a period of ten to thirty seconds, the portion of the concrete mass disposed within the zone of influence of the chute 6 will have been converted into plastic concrete free of gas pockets or so-called "voids" and from which all surplus water will have been eliminated.

The hand wheel 26 will now be operated to open the gates 30 while the motion of the chute 6 continues. As the gates 30 are opened gradually to the position indicated in dotted lines in Fig. 2, the receptacle will be gradually elevated so that when said gates 30 have attained the position shown in dotted lines in Fig. 2, their lower edges will be disposed at some distance above the surface of deposit of material discharged from the receptacle.

Owing to the violent shaking of the material as it flows progressively through the chute 6 and under the influence of the column-head of the mass of material disposed in the body of the receptacle, the material discharged from the chute 6, and which is still confined between the gates 30, will surge from the open space between the gates at the ends of the latter and also through open spaces between the lower edges of the gates 30 and the surface of deposit and will surge upwardly to an elevation appreciably above the upper edges of the discharge openings thus afforded at the ends, also to an appreciable elevation above the lower edges of the gates 30.

During the discharge of material, the receptacle will be moved either laterally or vertically or both in such relation with respect to time interval between the instant of opening of the gates 30 and emptying of the receptacle 1 as will cause all of the discharged material to be subjected progressively substantially equally to the action of the chute 6 and gates 30 to effect complete conversion of the mix into plastic concrete of a very dense nature, and wherein the mortar-forming constituents have been properly converted into plastic mortar.

During subjection of the mix to the action of the chute 6 and gates 30, the solid aggregates of the mix will be subjected to what may be termed a pounding and grinding and compressing action. These several forces will serve to break up the water content of the mass into microscopic particles and effect its distribution uniformly through the mass, while a very thorough mixing of sand and cement takes place, and thus will hasten the chemical reaction between the water and the cement to form the requisite powerful bond between non-cementitious solids of the mass. The drastic application of the aforesaid forces produces an ultimate concrete of very great density and strength.

The apparatus of this invention permits of the use of Portland cement mixes containing an appreciably smaller water-cement ratio than is commonly employed.

It is particularly pointed out that the apparatus of this invention converts the mix into its final condition before the latter is permitted to remain in place and that following the deposit of finished mix and the subsequent removal of the apparatus from all contact with the deposited material, the latter will not need to be subjected to any further treatment.

The duration of the treatment and deposit of the mix from the instant of its introduction into the mixing machine, to the time of its deposit, will not be more than three to five minutes. This short time interval is of extreme importance in connection with Portland cement concrete, not only for reasons of operating economy, but also because of the fact that Portland cement mortar begins to set at the instant of contact of the cement with water and proceeds very rapidly so that the best results are obtained by effecting deposit in place as rapidly as possible and completely avoiding further manipulation of the material after deposit. One of the greatest detriments to concrete mixes is that of over-working the same and this is avoided by use of the apparatus of the present invention.

It will be noted, of course, that the connections of the gates 30 with the connecting rods 29 are such that said gates will be practically held rigid with the chute 6 in all positions to which they are adjusted and will move in unison with said chute at all times.

The purpose of subjecting the material to the action of the gates 30 after it rests upon the surface of deposit, is to overcome the trapping of air in the mass and, further, to cause the lower surface of the freshly deposited mass to key itself into place in the surface of the previously deposited concrete or into the irregularities of the surface of deposit.

Obviously, before the drop gates are opened, the chute 6, with drop gates closed, constitutes a receptacle which is fed from the hopper above it if and when the latter is loaded. But it will be apparent that if the said chute 6 is of appreciable depth, it will not be dependent upon the hopper or its contents for successful operation but may be employed and operated as an independent unit. In such event, the body of the hopper would constitute the equivalent of a suitable means for carrying the motor and gate operating mechanism and supporting the chute.

I claim as my invention:

1. A receptacle equipped with a discharge opening in the bottom, a chute disposed for passage of material therethrough as it leaves said receptacle, said chute being carried by said receptacle and movable laterally relatively to the latter, a motor carried by the receptacle, for imparting to said chute substantially reciprocatory movement relatively to the receptacle through an appreciable stroke, closure drop gates for the bottom of said chute arranged to be opened and closed during movements of the chute relatively to the receptacle, manually operable mechanism mounted upon the receptacle and connected with said gates for operating the latter and maintaining the same substantially rigid with said chute at all points in the movement of said gates relatively to the receptacle for causing said gates to act upon material after its discharge from said chute and while maintained in the path of said gates.

2. A receptacle having a bottom discharge opening, a chute disposed for passage therethrough of material discharged from the receptacle, suspension means connecting said chute with said receptacle, a motor mounted upon the receptacle, reciprocable devices connecting said motor with said suspension means for imparting rocking substantially reciprocable movement to said chute relatively to said receptacle, closure drop gates mounted upon and controlling discharge of material from said chute, manually operable mechanism mounted upon said receptacle and connected with said suspension means and said gates for operating the latter and causing the same to be held firmly in any desired positions relatively to said chute to control discharge of material from the latter and to agitate material as it passes or remains disposed between said gates.

3. An apparatus for producing and laying plastic concrete mix equipped with a discharge opening in its bottom, a chute disposed below said opening and into and through which the mix passes from said receptacle, supporting devices connecting said chute with said receptacle and permitting movement of said chute relatively to the receptacle, a pair of opposed drop gates constituting a closure for the bottom of the chute, mechanism mounted upon the receptacle and operatively connected with said chute and said gates for causing the same to be moved in unison relatively to said receptacle, and manually operable means mounted on the receptacle and connected with said gates for opening and closing the same, while said chute is at rest or is in operation without interfering with the movements of said gates coincidentally with said chute for causing said gates to agitate mix in passage from said chute and following deposit thereof.

4. An apparatus of the type specified, an open bottom receptacle, a chute disposed to cause all material flowing from the bottom of the receptacle to pass through said chute, supporting means connecting the chute with the receptacle and permitting movement of the chute relatively to the receptacle, a pair of opposed closure drop gates hinged to opposed walls of the bottom of the chute, mechanism mounted upon the receptacle and operatively connected with said supporting means for imparting motion to the same and said chute, and manually operable gate actuating means mounted upon the body of the receptacle and connected with said gates and said supporting means and cooperating with the latter to maintain the gates substantially rigid with the chute in all positions of the gates relatively to the chute, thereby to cause said gates to agitate material passing or disposed between them after discharge from said chute.

5. An apparatus of the type specified, an open bottom receptacle, a chute disposed to cause all material flowing from the bottom of the receptacle to pass through said chute, supporting means connecting the chute with the receptacle and permitting movement of the chute relatively to the receptacle, a pair of opposed closure drop gates hinged to opposed walls of the bottom of the chute, mechanism mounted upon the receptacle and operatively connected with said supporting means for imparting motion to the same and said chute, a manually operable member mounted upon the receptacle, a reciprocable plunger connected with said member for actuation thereby, guides on said supporting means engaged with said plunger for causing the same to be rocked responsively to the movements of said supporting means, and a pair of divergent links connecting the lower end of the said plunger with said respective gates for actuating the latter.

6. Apparatus of the kind specified comprising an open bottom receptacle, a chute disposed to cause all material passing from the receptacle to flow through said chute, suspension devices connecting the chute with the receptacle, a motor mounted upon the receptacle and connected with said suspension devices for rocking the same and said chute relatively to the receptacle, a closure gate for and mounted upon the bottom of the chute, a manually operable gate actuating member mounted upon the receptacle, a plunger connected with said member, guides for said plunger mounted upon one of the suspension devices, and a link connecting said plunger with said gate, said link, plunger and suspension device cooperating to maintain said gate rigid with said chute in all positions of the gate relatively to the chute for causing said gate to agitate material passing from said chute or disposed in the path of said gate.

7. Apparatus of the kind specified comprising an open bottom receptacle, a chute disposed below and in substantial alignment with the said bottom opening, a pair of opposed closure gates hinged to respectively opposite side walls of the chute along the lower edges of the latter, suspension devices rigid with the end walls of the chute and pivotally secured to the receptacle at points above and spaced from the upper end of the chute, a mechanism mounted upon the receptacle and connected with said suspension devices for imparting rocking motion to the latter and the chute, and manually operable mechanism mounted upon the receptacle and said suspension devices and connected with said gates for operating the latter at any time during rocking or rest of said devices and chute and holding said gates firmly in any desired position relatively to said chute.

8. Apparatus of the kind specified comprising an open bottom receptacle, a chute disposed below and in substantial alignment with the said bottom opening, a pair of opposed closure gates hinged to respectively opposite side walls of the chute along the lower edges of the latter, suspension devices rigid with the end walls of the chute and pivotally secured to the receptacle at points above and spaced from the upper end of the chute, a mechanism mounted upon the receptacle and connected with said suspension devices for imparting rocking motion to the latter and the chute, a manually rotatable shaft extending through the receptacle above the upper ends of the suspension devices, cranks rigid with said shaft, guides on the suspension devices, crankrods engaged between their ends in said guides and at their upper ends with said cranks, and links connecting the lower ends of said crankrods with said gates.

9. Apparatus of the type set forth comprising a motor, a carrier for said motor, a receptacle for concrete mix movable relatively to and supported by said carrier, mechanism connecting said motor with said receptacle for imparting to the latter appreciable forward and back movements at high speed, drop-gates mounted upon the receptacle and constituting a closure for the bottom thereof, and mechanism mounted upon the carrier and connected with said gates for operating the latter, the connection between said gates and the mechanism for operating the same including means whereby the gates are maintained substantially rigid with said receptacle in all positions to which said gates may be moved, thereby to cause said gates to agitate material disposed between them when open as the same is discharged from the receptacle.

10. Apparatus of the type set forth comprising a motor, a carrier for said motor, a receptacle for concrete mix, devices connecting said receptacle with said carrier for support by the latter while permitting movement of said receptacle relatively to said carrier, a drop gate secured to said receptacle and constituting a closure for the bottom of the receptacle, mechanism mounted upon the carrier and engaged with said devices and said drop-gate for actuating said gate, and means whereby said motor imparts high-speed forward and back-motion to said receptacle, said devices and a portion of said mechanism for causing said gate to be maintained substantially rigid with the receptacle at all points in the movement of the gate relatively to the receptacle.

ALFRED W. FRENCH.